US012596639B2

(12) United States Patent
Ghergu et al.

(10) Patent No.: US 12,596,639 B2
(45) Date of Patent: Apr. 7, 2026

(54) SELF-GENERATING ROBOTIC PROCESS ENVIRONMENTS

(71) Applicant: International Business Machines Corporation, Armonk, NY (US)

(72) Inventors: Laurentiu Gabriel Ghergu, Bucharest (RO); Alexandru-Liviu Stirbu, Bucharest (RO); Panagiotis Lazarou, Bucharest (RO); Ciprian Constantinescu, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 18/214,932

(22) Filed: Jun. 27, 2023

(65) Prior Publication Data

US 2025/0004920 A1    Jan. 2, 2025

(51) Int. Cl.
| | |
|---|---|
| *G06F 9/44* | (2018.01) |
| *G06F 9/445* | (2018.01) |
| *G06F 9/45* | (2006.01) |
| *G06F 9/455* | (2018.01) |
| *G06F 11/3668* | (2025.01) |
| *G06F 11/3698* | (2025.01) |

(52) U.S. Cl.
CPC ...... *G06F 11/3698* (2025.01); *G06F 11/3684* (2013.01); *G06F 11/3688* (2013.01)

(58) Field of Classification Search
CPC ............. G06F 11/3698; G06F 11/3684; G06F 11/3688
See application file for complete search history.

(56) References Cited

U.S. PATENT DOCUMENTS

| | | | |
|---|---|---|---|
| 10,977,166 B1 * | 4/2021 | Jaganmohan | ............ G06N 5/02 |
| 11,366,747 B2 | 6/2022 | Allen et al. | |
| 11,500,762 B2 * | 11/2022 | Hamid | ................ G06F 9/45558 |

(Continued)

FOREIGN PATENT DOCUMENTS

| | | | | |
|---|---|---|---|---|
| CN | 110232017 A | * | 9/2019 | .......... G06F 11/3688 |
| CN | 113886262 A | * | 1/2022 | .......... G06F 11/3688 |

(Continued)

OTHER PUBLICATIONS

Solomiya Yatskiv, Improved Method of Software Automation Testing based on the Robotic Process Automation, 2019, pp. 1-4. https://ieeexplore.ieee.org/stamp/stamp.jsp?tp=&arnumber=8780038 (Year: 2019).*

(Continued)

*Primary Examiner* — Mongbao Nguyen
(74) *Attorney, Agent, or Firm* — James L. Olsen

(57) ABSTRACT

One embodiment provides a method of using a computing device to provide regression testing for RPA including monitoring, by the computing device, an RPA bot while the RPA bot is executing a routine in a web test environment. Based on the monitoring, the computing device generates a simulated environment including all elements of the web test environment that the RPA bot interacts with. The computing device further continuously runs the routine in the simulated environment. Upon detecting a change in the web test environment, the computing device propagates the change to the simulated environment and verifies whether the change breaks the routine.

20 Claims, 5 Drawing Sheets

70

Monitoring, By The Computing Device, An RPA Bot While The RPA Bot Is Executing A Routine In A Web Test Environment
71

Based On The Monitoring, Generating, By The Computing Device, A Simulated Environment Comprising All Elements Of The Web Test Environment That The RPA Bot Interacts With
72

Continuously Running, By The Computing Device, The Routine In The Simulated Environment
73

Upon Detecting A Change In The Web Test Environment, Propagating, By The Computing Device, The Change To The Simulated Environment And Verifying Whether The Change Breaks The Routine
74

(56) References Cited

U.S. PATENT DOCUMENTS

| | | | | |
|---|---|---|---|---|
| 11,726,902 B1* | 8/2023 | Ganesan | ............. | G06F 11/0772 |
| | | | | 717/124 |
| 2021/0173760 A1* | 6/2021 | Downie | ............. | G06F 11/3698 |
| 2021/0191843 A1 | 6/2021 | Stocker et al. | | |
| 2022/0164279 A1 | 5/2022 | Stocker et al. | | |
| 2022/0391310 A1 | 12/2022 | Ghergu et al. | | |
| 2024/0012387 A1* | 1/2024 | Stan | ................... | G05B 19/4155 |
| 2024/0256227 A1* | 8/2024 | Patel | ........................ | G06F 8/30 |

FOREIGN PATENT DOCUMENTS

| | | | | | |
|---|---|---|---|---|---|
| CN | 114490285 A | * | 5/2022 | ....... | H04N 21/43637 |
| CN | 112579443 B | | 7/2022 | | |
| CN | 115943368 A | * | 4/2023 | ......... | G05B 19/0426 |

OTHER PUBLICATIONS

Grigore (CN 115943368 A), 2023, pp. 1-21. (Year: 2023).*
Zhi (CN 110232017 A), 2019, pp. 1-7. (Year: 2019).*
Ganeshayya Shidaganti, Robotic Process Automation with AI and OCR to Improve Business Process: Review, 2021, pp. 1-7. https://ieeexplore.ieee.org/stamp/stamp.jsp?tp=&arnumber=9532902 (Year: 2021).*

English translation, Chen et al. (CN 113886262 A), 2022, pp. 1-14. (Year: 2022).*
English translation, Tang et al. (CN 114490285 A), 2022, pp. 1-7. (Year: 2022).*
Daehyoun Choi, Enabling the Gab Between RPA and Process Mining: User Interface Interactions Recorder, 2022, pp. 1-9 https://ieeexplore.ieee.org/stamp/stamp.jsp?tp=&arnumber=9751752 (Year: 2022).*
Akash Ravi, Exploring RPA (Robotic Process Automation) as a Means to Test and Develop User Interfaces, 2022, pp. 1-9 https://www.researchgate.net/publication/363338171_Exploring_RPA_Robotic_Process_Automation_as_a_Means_to_Test_and_Develop_User_Interfaces (Year: 2022).*
Kaur, J., "RPA Testing—Debugging the Myths and Facts about RPA", XenonStack, Jun. 9, 2022, downloaded Jun. 21, 2023 from: https://www.xenonstack.com/insights/rpa-testing#xenonstack1, India.
Eshghi, B., "RPA Testing: What It Is, Importance, & Best Practices in 2023", AI Multiple, Jul. 7, 2022, downloaded on Jun. 21, 2023 from: https://research.aimultiple.com/rpa-testing/, Estonia.
Dilmegani, "Best practices of RPA testing", Retrieved from: https://research.aimultiple.com/rpa-testing/, 2025, 9 pages.
Gill, "Introducing RPA Testing Methodology", Retrieved from: https://www.xenonstack.com/insights/rpa-testing#xenonstack1, 2025, 16 pages.

* cited by examiner

Figure 4:
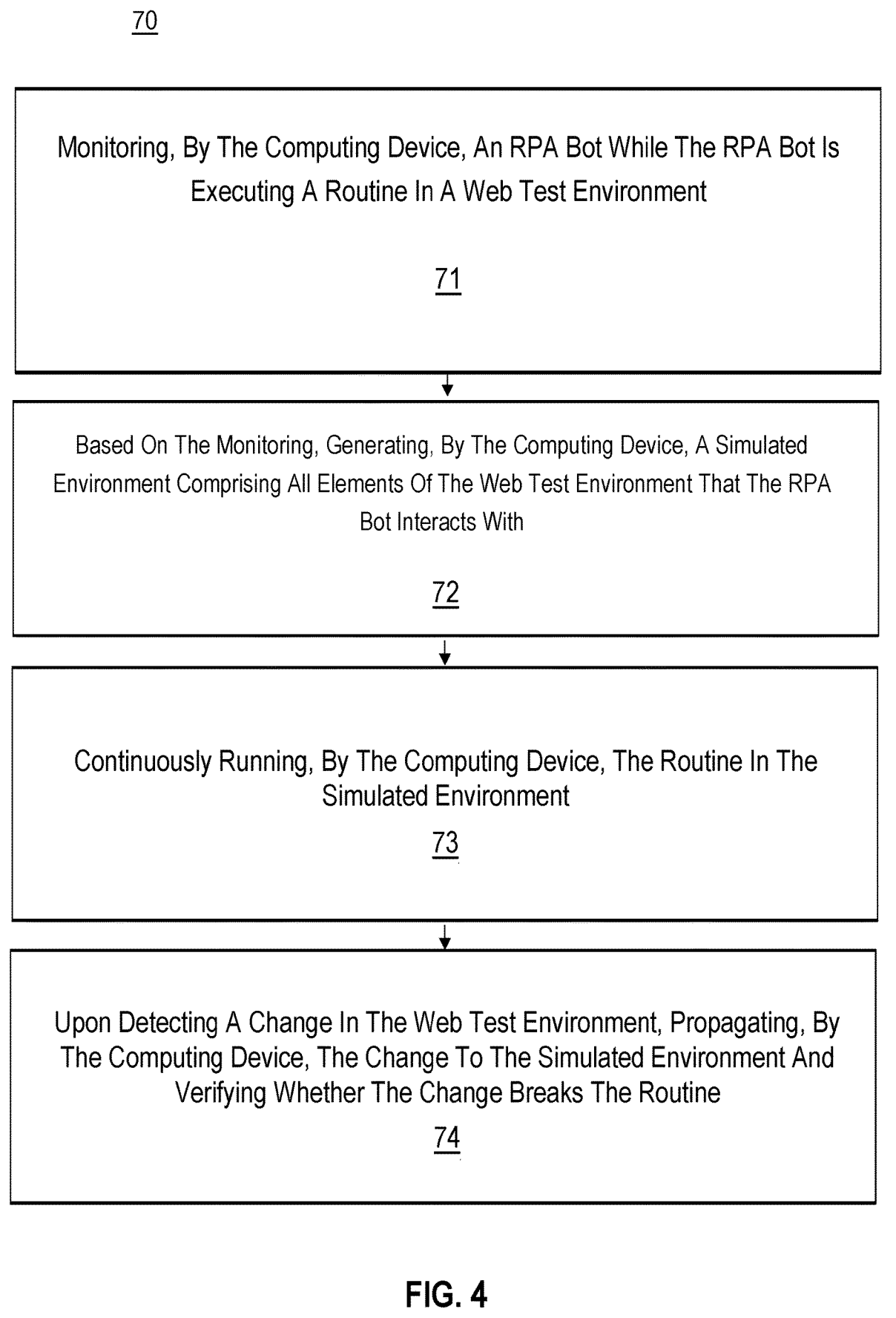

70

Monitoring, By The Computing Device, An RPA Bot While The RPA Bot Is Executing A Routine In A Web Test Environment

71

Based On The Monitoring, Generating, By The Computing Device, A Simulated Environment Comprising All Elements Of The Web Test Environment That The RPA Bot Interacts With

72

Continuously Running, By The Computing Device, The Routine In The Simulated Environment

73

Upon Detecting A Change In The Web Test Environment, Propagating, By The Computing Device, The Change To The Simulated Environment And Verifying Whether The Change Breaks The Routine

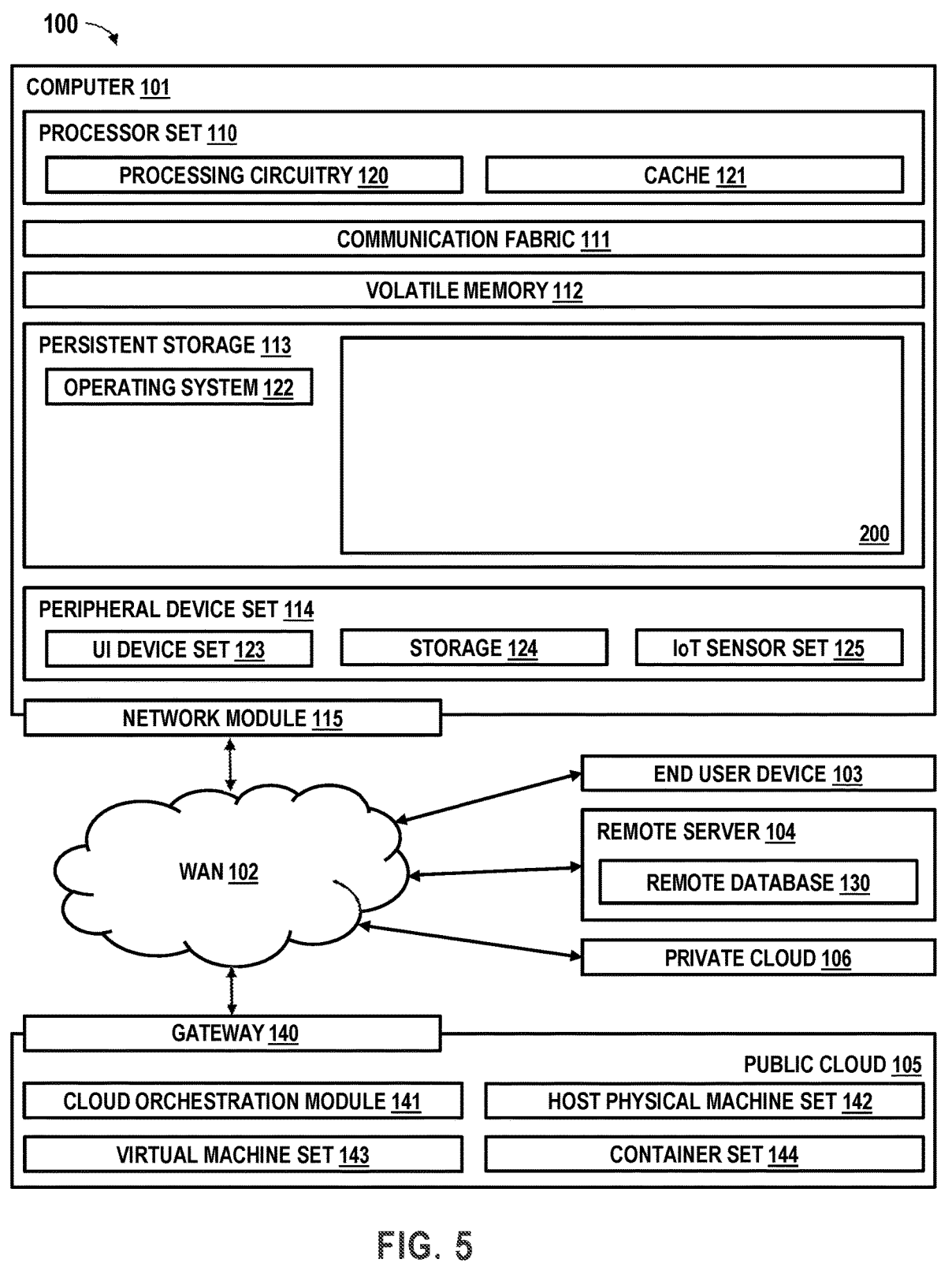

COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122

200

PERIPHERAL DEVICE SET 114

UI DEVICE SET 123       STORAGE 124       IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143        CONTAINER SET 144

FIG. 5

SELF-GENERATING ROBOTIC PROCESS ENVIRONMENTS

BACKGROUND

The field of embodiments of the present invention relates to providing regression testing for Robotic Process Automation (RPA).

Robotic process automation (RPA) is a software technology that makes it simple to build, deploy and manage software bots (or robots) that emulate human actions interacting with software and digital systems. Most RPA vendors currently support unit testing as the main method of automatic testing for RPA bots. This is a concept that is borrowed from traditional software development where it is used for regression testing. For the RPA industry it has a limited impact unlike traditional software as the RPA code is focused on implementing a specific process. In traditional software development unit testing, regression testing is very useful as the software is formed out of independent chunks of business logic and utility functions, which may be tested independently and in isolation. These code pieces are based on logic. As developers modify the code it is easy to introduce logic errors in these code modules. Due to this fact, unit testing is very efficient in catching bugs as part of regression testing.

SUMMARY

Embodiments relate to providing regression testing for Robotic Process Automation (RPA). One embodiment provides a method of using a computing device to provide regression testing for RPA including monitoring, by the computing device, an RPA bot while the RPA bot is executing a routine in a web test environment. Based on the monitoring, the computing device generates a simulated environment including all elements of the web test environment that the RPA bot interacts with. The computing device further continuously runs the routine in the simulated environment. Upon detecting a change in the web test environment, the computing device propagates the change to the simulated environment and verifies whether the change breaks the routine.

These and other features, aspects and advantages of the present embodiments will become understood with reference to the following description, appended claims and accompanying figures.

BRIEF DESCRIPTION OF THE DRAWINGS

FIG. 4 illustrates a process for using a computing device to provide regression testing for an RPA, according to an embodiment; and FIG. 5 illustrates an example computing environment utilized by one or more embodiments.

DETAILED DESCRIPTION

Figure 1:
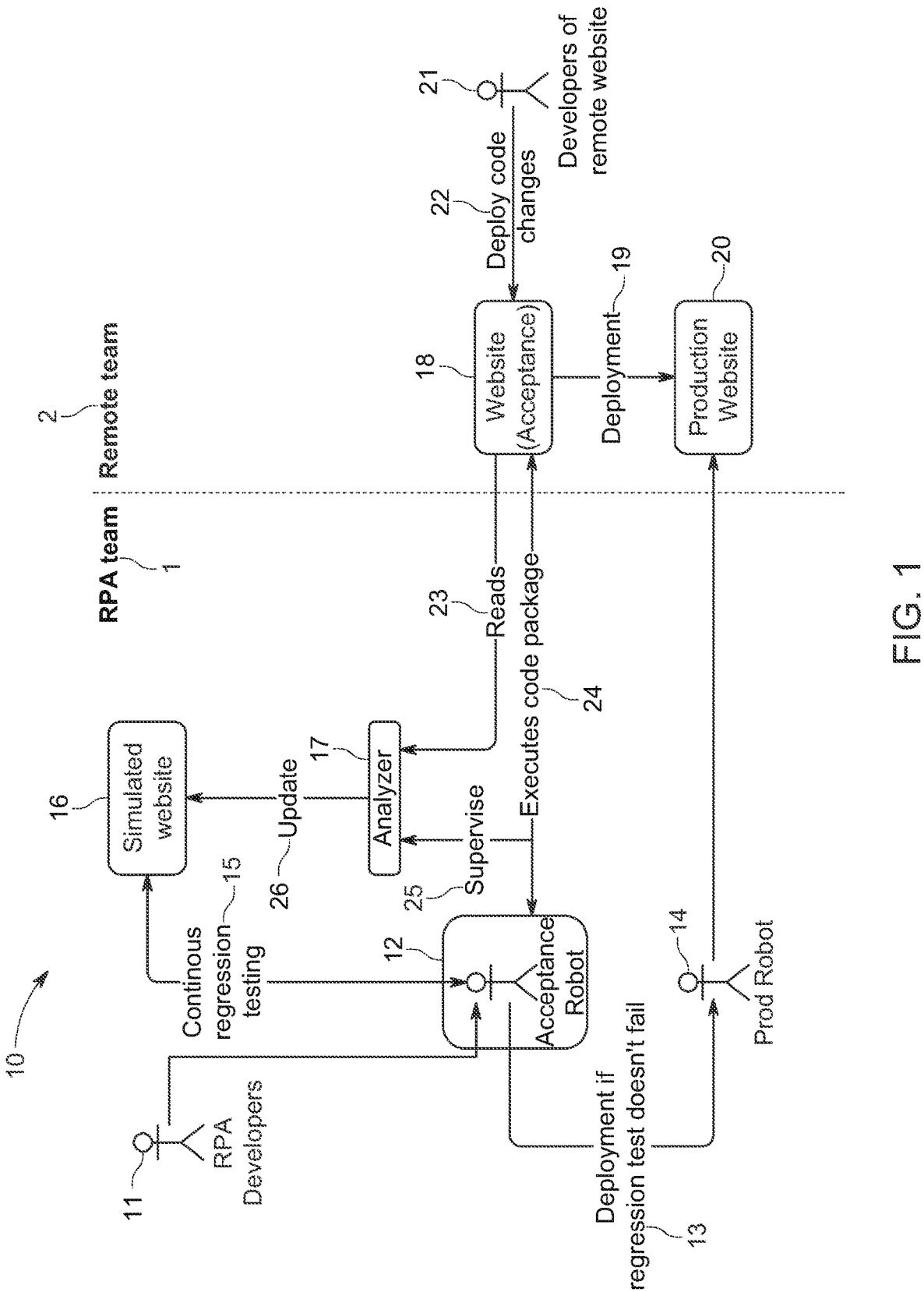
FIG. 1 illustrates a high level flow diagram for an AutoWeb tool that supervises a Robotic Process Automation (RPA) robot as it executes various processes, according to one embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to providing regression testing for Robotic Process Automation (RPA). One embodiment provides a method of using a computing device to provide regression testing for RPA including monitoring, by the computing device, an RPA bot while the RPA bot is executing a routine in a web test environment. Based on the monitoring, the computing device generates a simulated environment including all elements of the web test environment that the RPA bot interacts with. The computing device further continuously runs the routine in the simulated environment. Upon detecting a change in the web test environment, the computing device propagates the change to the simulated environment and verifies whether the change breaks the routine.

For the RPA industry, most of the regression issues are not an effect of logic errors (due to developers modifying existing software code and not understanding the coded behavior of a specific module or process) but rather as out of changes in the remote system that a bot (or robot) needs to work with. This is caused by a couple of forces: 1) RPA is process oriented, which reduces the software code base where one can use unit testing; 2) process steps have limited complexity and may be easily understood; and 3) it is easy to spot process failure due to errors of logic as the process will fail in obvious ways.

Additionally, the RPA industry does not have an automated solution for integration testing, and access to the acceptance environment of the web applications on which the RPA bot is depending on is very limited to the RPA teams. This is due to there being many cases in the industry where RPA is run on applications where there is not a development team available and, therefore, alternative integration approaches, such as a Representational State Transfer (REST) Application Programming Interface (API), cannot be used.

Further, when creating integration tests for the purpose of regression testing, there is a need to clean up and setup specific elements in the web applications that the bot/robot is using. For example, if a process is designed to create a record, at the end of the integration test, the record must also be deleted otherwise the web application where the bot/robot is being applied can continuously grow. While this is acceptable for a production environment, it is really challenging to adopt this strategy in a test scenario.

Conventional systems do not automatically clone the subset of an environment used by the bot/robot for increasing the speed of regression testing. One or more embodiments provide a solution for automated integration testing of RPA solutions, which reduces the need for unit testing and improves the overall system stability from a regression issues standpoint.

FIG. 1 illustrates a high level flow diagram 10 for an AutoWeb tool that supervises a RPA robot as it executes various processes, according to one embodiment. In one embodiment, the AutoWeb tool (including the analyzer 17 and the simulated website 16) is a tool that supervises an RPA robot (or bot) as it is executing various processes in a web test environment (development, test, pre-production, production, etc.). The AutoWeb tool automatically generates a simulated environment with similar characteristics of the analyzed environment. In one embodiment, the simulated web application only supports usage on the path that the original robot (or bot) has taken in the original web application. In one embodiment, the system then runs the RPA bot processes in this simulated environment (for example, in a continuous fashion) and confirms that in case of changes the code is not crashing. This serves as automated regression testing as it reduces the probability that developers will introduce new issues as they modify the existing code. AutoWeb continuously monitors the original system and propagates the changes to the simulated environment. In case the developers of the remote system are introducing changes to the user interface (UI) elements (impacting the ability of RPA selectors to detect the target Hypertext Markup Language (HTML) element), one embodiment automatically catches them and reports an issue for developers to correct. In one embodiment, the preferred test environment of the remote application that AutoWeb can analyze is an acceptance (pre-production) environment as this allows for approved and planned changes that may be impacting the RPA code to be determined before a go-live scenario.

In one embodiment, on the RPA team 1 side of diagram 10, the RPA developers 11 deploy a package (e.g., a regression test software processing package) to an acceptance robot (or bot) 12. If the regression test of the system does not fail, the acceptance robot 12 deploys the regression test at reference number 13 to a production robot (or bot) 14. The acceptance robot 12 provides continuous regression testing 15 for a simulated website 16. On the remote team 2 side of the diagram 10, developers 21 of a remote website deploy code changes 22 to a website (acceptance) 18, which provides deployment 19 of the modified code toa production website 20.

In one embodiment, analyzer 17 is first trained on the original website (website 18) to understand which parts are used by the RPA robot. This does not have to be dedicated processing as one embodiment is provided as a platform feature and hence it can understand if the robot code was changed in comparison with previous deployments either automatically or via a configuration parameter (clean integration tests). As the code package is executed (at reference number 24), the acceptance robot 12 receives information as does the website 18 while the executing code package 24 supervises 25 the analyzer 17. The analyzer 17 reads 23 information from the website 18 and provides an update 26 to automatically generate the simulated website 16 using just the paths from the original website 18 that the robot was using. For future iterations, one embodiment detects, via static code analysis, which parts of the process code did not change and for those it runs the regression tests by re-executing the RPA processes.

The embodiments provide the feature of catching errors before the production robot 14 is affected by changes in the dependent web systems (e.g., from deployment of code changes 22). One embodiment continuously scans the dependent systems in their acceptance/test environment and notifies the RPA developers 21 in real time in case HTML is changed and RPA selectors may be affected. One embodiment provides limited (to no) developer effort required for achieving regression testing (reduces need for unit testing). For each test, the RPA bot (acceptance robot 12) starts with a clean web application context where it does not have to clean the web application on each test run.

Figure 2:
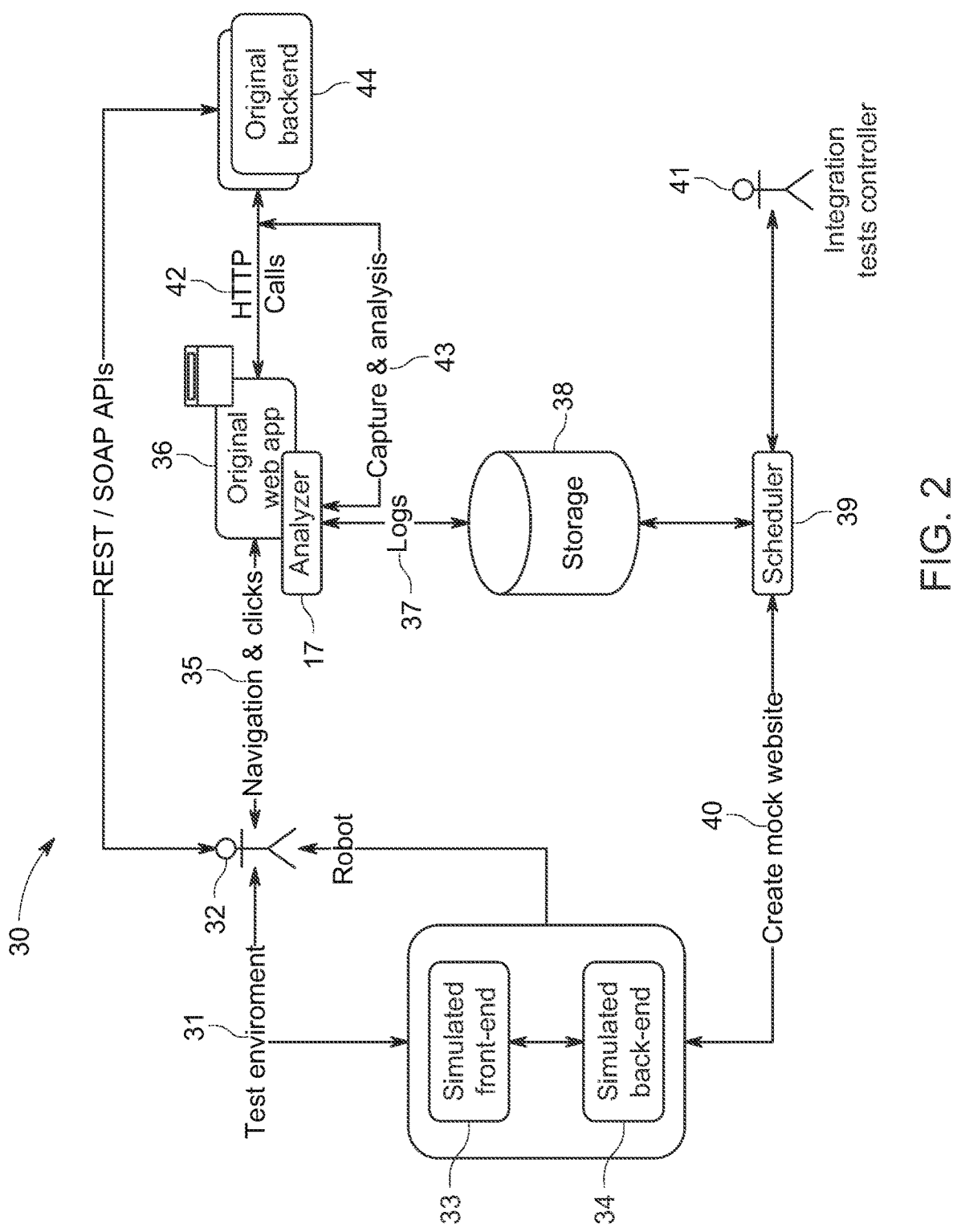
FIG. 2 illustrates exemplar components for the AutoWeb tool in a system, according to one embodiment.

FIG. 2 illustrates exemplar components for the AutoWeb tool (including the simulated website that includes the simulated front-end 33 and simulated back-end 34, the analyzer 17, storage 38 and scheduler 39) in system 30, according to one embodiment. In one embodiment, the RPA bot 41 provides integration tests and communicates with the scheduler 39. The scheduler 39 is a component that determines the scheduling of the RPA bot 41 integration testing. In one embodiment, scheduler 39 may be a cron job (e.g., a command used for scheduling tasks to be executed sometime in the future) or other form of scheduler that is integrated with the actual platform.

In one embodiment, the analyzer 17 is a browser plugin that runs in a test environment virtual machine under the control of the RPA team 1 (FIG. 1). This browser plugin intercepts network calls, captures (capture and analysis 43) the details of robot 32 (or bot) navigation and clicks 35 and tracks the uniform resource locators (URLs) that the robot 32 is visiting. All the information collected will be stored in storage 38 (e.g., a database, etc.). The analyzer 17 is able to obtain the decrypted Hypertext Transfer Protocol (HTTP) traffic because it is logging (logs 37) at the application layer (browser plugin), not at network layer (HTTP secure (HTTPS) is open systems interconnection (OSI) layer seven (7) protocol). The scheduler 39 schedules creation of a mock website (at reference number 40) that includes the simulated front-end 33 and simulated back-end 34 of the test environment 31.

In one embodiment, cookies are tracked by the analyzer 17 (based on the response header) and are going to be included in the simulated environment (test environment 31) with the same values (for example as part of the static response). In one embodiment, the AutoWeb tool automatically uses the hosts file on the WINDOWS® (or alternative file for alternative operating system (OS)) to re-write domain name system (DNS) records in order to mimic that the website is the original website app 36. This allows the robot 32 running on the simulated website to use the original website app 36 URLs (no code change needed), while hitting the 127.0.0.1 Internet Protocol (IP) (localhost).

In one embodiment, if the original website app 36 is using HTTPS traffic 42 (calls) (which can be detected based on the URL), the AutoWeb tool is going to generate a self-signed certificated for a certificate authority that is trusted by the browser installed on the regression test virtual machine. This allows the simulated website to mimic the HTTPS connectivity of the original website app 36 without the RPA robot 32 noticing any difference.

In one embodiment, a specific RPA process or RPA process step may be skipped for regression testing if the developers notice false positives. Authentication to the system 30 works via static pages. This is achieved by creating a simulated back-end 34 for the dependent application. The simulated back-end 34 provides a static response (including cookies captured in origin) for specific input URL and input request (from the training). This allows the robot 32 to consider that the login mechanism works as usual, however on the back-end side there is no code that is processing the login cookies for example. This makes the entire authentication work.

In some embodiments, in case the robot 32 needs to upload a file, the system 30 will either proxy the request to the remote web service or allows the upload to a temporary folder, or the system 30 allows the developer to skip the process step executing the upload. In one embodiment, the system 30 may create static routes to the original website app 36 in specific situations upon request by playing the role of a reverse proxy. This feature may be used in a couple of use cases depending on how the original website app 36 is coded. In one embodiment, if the processing needs to use non-web application resources, the system 30 allows developers to run setup and tear-down scripts that will populate the test virtual machine with the required setup.

Figure 3:
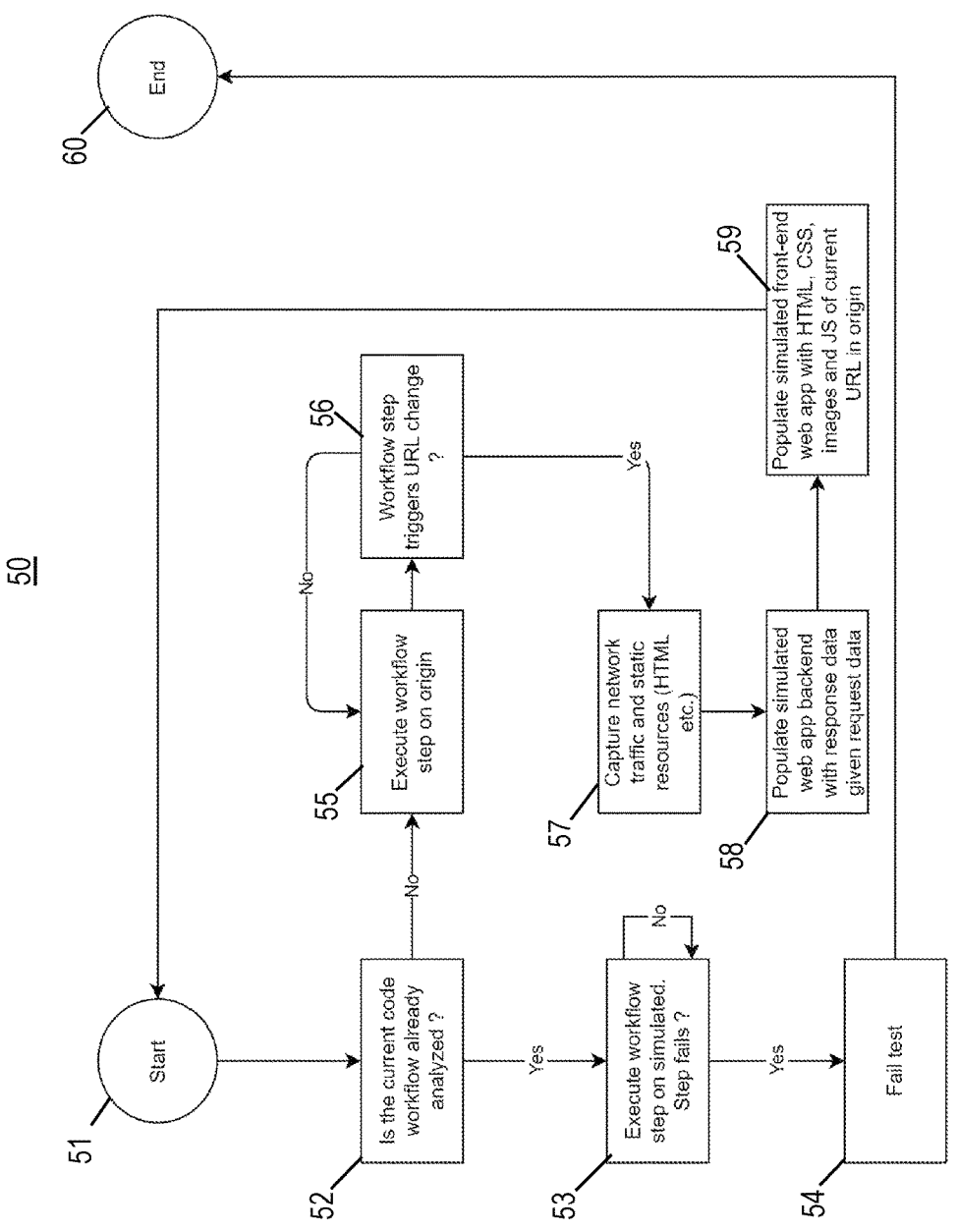
FIG. 3 illustrates a high level process used by the AutoWeb tool (spanning all components), according to one embodiment.

FIG. 3 illustrates a high level process 50 used by the AutoWeb tool (spanning all components), according to one embodiment. In one embodiment, the process 50 begins at the start block 51. In block 52, process 50 determines whether the current code workflow has been already analyzed. If the current code workflow has been already analyzed, process 50 proceeds to block 53 where the workflow step is executed on a simulated website. Block 53 further determines whether the workflow step fails or not. If the workflow step does not fail, block 53 further executes the next step on the simulated website. If the workflow step does fail, process 50 proceeds to block 54 where the test is considered as failed and process 50 proceeds to block 60, which ends or stops process 50. If the current code workflow was not already analyzed in block 52, process 50 proceeds to block 55.

In one embodiment, in block 55 process 50 executes the workflow step on the original website. Process 50 proceeds to block 56 where it is determined whether the workflow step triggers a URL change. If it is determined that the workflow step did not trigger a URL change, process 50 returns back to block 55. If it is determined that the workflow step did trigger a URL change, process 50 proceeds to block 57. In block 57, process 50 captures network traffic and static resources (e.g., HTML, etc.). Process 50 proceeds to block 58 where the simulated website app back-end is populated with response data given the request data. Process 50 proceeds to block 59 where the simulated front-end of the website app is populated with HTML, cascading style sheets (CSS), images and JAVASCRIPT®, etc. of a current URL in the original website. Process 50 then proceeds back to block 51.

FIG. 4 illustrates a process 70 for using a computing device to provide regression testing for an RPA, according to an embodiment. In one embodiment, in block 71 process 70 monitors, by a computing device, an RPA bot (or robot) while the RPA bot is executing a routine in a web test environment. In block 72, process 70 provides that based on the monitoring, generation, by the computing device, of a simulated environment comprising all elements of the web test environment that the RPA bot interacts with. In block 73, process 70 provides continuously running, by the computing device, the routine in the simulated environment. In block 74, process 70 provides that upon detecting a change in the web test environment, propagation, by the computing device, of the change to the simulated environment and verification of whether the change breaks the routine.

In some embodiments, process 70 may include the feature where the routine is automatically regression tested.

In one or more embodiments, process 70 may further include the feature that upon RPA code spanning multiple processes across multiple websites, simulating, by the computing device, multiple web applications for the multiple websites.

In some embodiments, process 70 may include the feature where the simulated environment is an acceptance (pre-production) environment for testing approved and planned changes that impact the RPA code for an actual (production) environment.

In one or more embodiments, process 70 may additionally include the feature that at least a portion of URLs used by the bot in the simulated environment is proxied to an original web application.

In some embodiments, process 70 may further include the feature that an analyzer process executes in the web test environment, and the analyzer process comprises a browser plugin that executes in the web test environment as a virtual machine that is configured for intercepting network calls, capturing details of clicks of the RPA bot and tracking the URLs that the bot visits.

In one or more embodiments, process 70 may include the feature that a scheduler process executes in the web test environment and determines integration testing scheduling for the RPA bot.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 5 illustrates an example computing environment 100 utilized by one or more embodiments. Computing environment 100 contains an example of an environment for the execution of at least some of the computer code 200 involved in performing the inventive methods (such as RPA processing for regression testing, etc.). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method of using a computing device to provide regression testing for Robotic Process Automation (RPA), the method comprising:

monitoring, by the computing device, an RPA bot while the RPA bot is executing a routine in a web test environment;

based on the monitoring, generating, by the computing device, a simulated environment comprising all elements of the web test environment the RPA bot interacts with;

continuously running, by the computing device, the routine in the simulated environment; and upon detecting a change in the web test environment, propagating, by the computing device, the change to the simulated environment and verifying whether the change breaks the routine.

2. The method of claim 1, wherein the routine is automatically regression tested.

3. The method of claim 1, further comprising:

upon RPA code spanning a plurality of processes across multiple websites, simulating, by the computing device, a plurality of web applications for the multiple websites.

4. The method of claim 1, wherein the simulated environment is an acceptance environment for testing approved and planned changes impacting RPA code for an actual environment.

5. The method of claim 1, wherein at least a portion of uniform resource locators (URLs) used by the RPA bot in the simulated environment is proxied to an original web application.

6. The method of claim 5, wherein an analyzer process executes in the web test environment, and the analyzer process comprises a browser plugin that executes in the web test environment as a virtual machine that is configured for intercepting network calls, capturing details of clicks of the RPA bot and tracking the URLs the RPA bot visits.

7. The method of claim 5, wherein a schedular process executes in the web test environment and determines integration testing scheduling for the RPA bot.

8. A computer program product for providing regression testing for Robotic Process Automation (RPA), the computer program product comprising a computer readable storage medium having program instructions embodied therewith, the program instructions executable by a processor to cause the processor to:

monitor, by the processor, an RPA bot while the RPA bot is executing a routine in a web test environment;

based on the monitoring, generate, by the processor, a simulated environment comprising all elements of the web test environment the RPA bot interacts with;

continuously run, by the processor, the routine in the simulated environment; and upon detecting a change in the web test environment, propagate, by the processor, the change to the simulated environment and verifying whether the change breaks the routine.

9. The computer program product of claim 8, wherein the routine is automatically regression tested.

10. The computer program product of claim 8, wherein the program instructions executable by the processor further cause the processor to:

upon RPA code spanning a plurality of processes across multiple websites, simulate, by the processor, a plurality of web applications for the multiple websites.

11. The computer program product of claim 8, wherein the simulated environment is an acceptance environment for testing approved and planned changes impacting RPA code for an actual environment.

12. The computer program product of claim 8, wherein at least a portion of uniform resource locators (URLs) used by the RPA bot in the simulated environment is proxied to an original web application.

13. The computer program product of claim 12, wherein an analyzer process executes in the web test environment, and the analyzer process comprises a browser plugin that executes in the web test environment as a virtual machine that is configured for intercepting network calls, capturing details of clicks of the RPA bot and tracking the URLs the RPA bot visits.

14. The computer program product of claim 12, wherein a schedular process executes in the web test environment and determines integration testing scheduling for the RPA bot.

15. An apparatus comprising:

a memory configured to store instructions; and a processor configured to execute the instructions to:

monitor an RPA bot while the RPA bot is executing a routine in a web test environment;

based on the monitoring, generate a simulated environment comprising all elements of the web test environment the RPA bot interacts with;

continuously run the routine in the simulated environment; and upon detection of a change in the web test environment, propagate the change to the simulated environment and verifying whether the change breaks the routine.

16. The apparatus of claim 15, wherein the routine is automatically regression tested.

17. The apparatus of claim 15, wherein the processor is further configured to execute the instructions to:

upon RPA code spanning a plurality of processes across multiple websites, simulate a plurality of web applications for the multiple websites.

18. The apparatus of claim 15, wherein the simulated environment is an acceptance environment for testing approved and planned changes impacting RPA code for an actual environment.

19. The apparatus of claim 15, wherein at least a portion of uniform resource locators (URLs) used by the RPA bot in the simulated environment is proxied to an original web application.

20. The apparatus of claim 19, wherein:

an analyzer process executes in the web test environment;

the analyzer process comprises a browser plugin that executes in the web test environment as a virtual machine that is configured for intercepting network calls, capturing details of clicks of the RPA bot and tracking the URLs the RPA bot visits; and a schedular process executes in the web test environment and determines integration testing scheduling for the RPA bot.

* * * * *